(12) United States Patent
Baek et al.

(10) Patent No.: US 7,840,750 B2
(45) Date of Patent: Nov. 23, 2010

(54) ELECTRICAL TRANSMISSION SYSTEM IN SECRET ENVIRONMENT BETWEEN VIRTUAL DISKS AND ELECTRICAL TRANSMISSION METHOD THEREOF

(75) Inventors: Jong Deok Baek, Gunpo-Si (KR); Yang Jin Seo, Seoul (KR); Hang Bae Chang, Seoul (KR)

(73) Assignee: Softcamp Co., Ltd. (KR)

( * ) Notice: Subject to any disclaimer, the term of this patent is extended or adjusted under 35 U.S.C. 154(b) by 549 days.

(21) Appl. No.: 11/720,306

(22) PCT Filed: Nov. 24, 2005

(86) PCT No.: PCT/KR2005/003974

§ 371 (c)(1),
(2), (4) Date: May 25, 2007

(87) PCT Pub. No.: WO2006/057514

PCT Pub. Date: Jun. 1, 2006

(65) Prior Publication Data

US 2008/0229041 A1    Sep. 18, 2008

(30) Foreign Application Priority Data

Nov. 25, 2004    (KR) .................... 10-2004-0097465

(51) Int. Cl.
*G06F 12/00* (2006.01)
(52) U.S. Cl. ....................................... 711/112
(58) Field of Classification Search ........................ None
See application file for complete search history.

(56) References Cited

U.S. PATENT DOCUMENTS

| 5,940,516 | A | 8/1999 | Mason et al. |
| 6,175,924 | B1 | 1/2001 | Arnold |
| 6,658,526 | B2 | 12/2003 | Nguyen et al. |
| 2003/0204700 | A1 | 10/2003 | Biessener et al. |
| 2008/0229041 | A1* | 9/2008 | Baek et al. .................. 711/163 |

FOREIGN PATENT DOCUMENTS

| JP | 09-044407 | 2/1997 |
| KR | 1020010113119 | 12/2001 |

* cited by examiner

*Primary Examiner*—Brian R Peugh
(74) *Attorney, Agent, or Firm*—Park & Associates IP Law LLC

(57) ABSTRACT

The present invention relates to a secure transmission system and secure transmission method that securely transmit data stored in a computer to different computers via a Local Area Network or the Internet. The secure transmission system includes a virtual disk, configured to allow only an authorized application program module to gain an access and read, write and edit information data; and a secure communication application module including a user information generation means for generating intrinsic user information at the time of setting up the virtual disk, a user information storage means for storing the generated user information, an outgoing file management means for searching the virtual disk for information data to be sent and compressing the found information data, generating the header information of the information data in which user information about a sender and/or a recipient is contained, and adding the generated header information to the user information, an incoming file management means for reading the header information of received information data, decompressing compressed information data, and storing the decompressed information data on the virtual disk, and a file security means for encrypting and decrypting information data to be sent or received information data.

10 Claims, 7 Drawing Sheets

[Fig. 1]
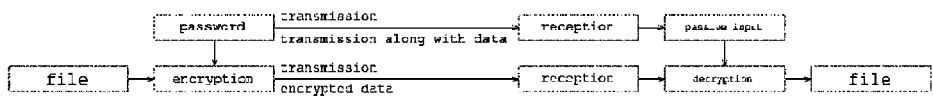
(a)
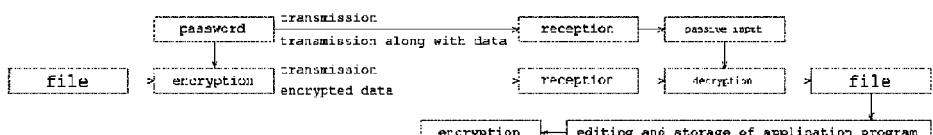
(b)
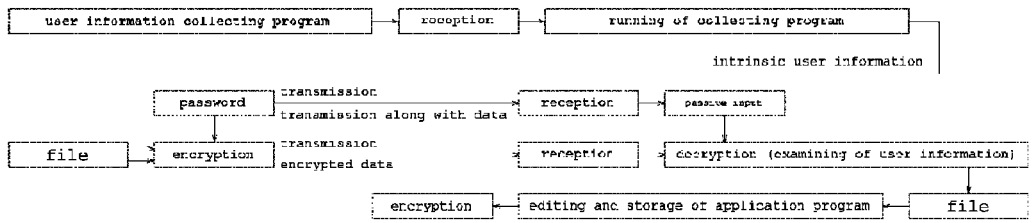
(c)
[Fig. 2]
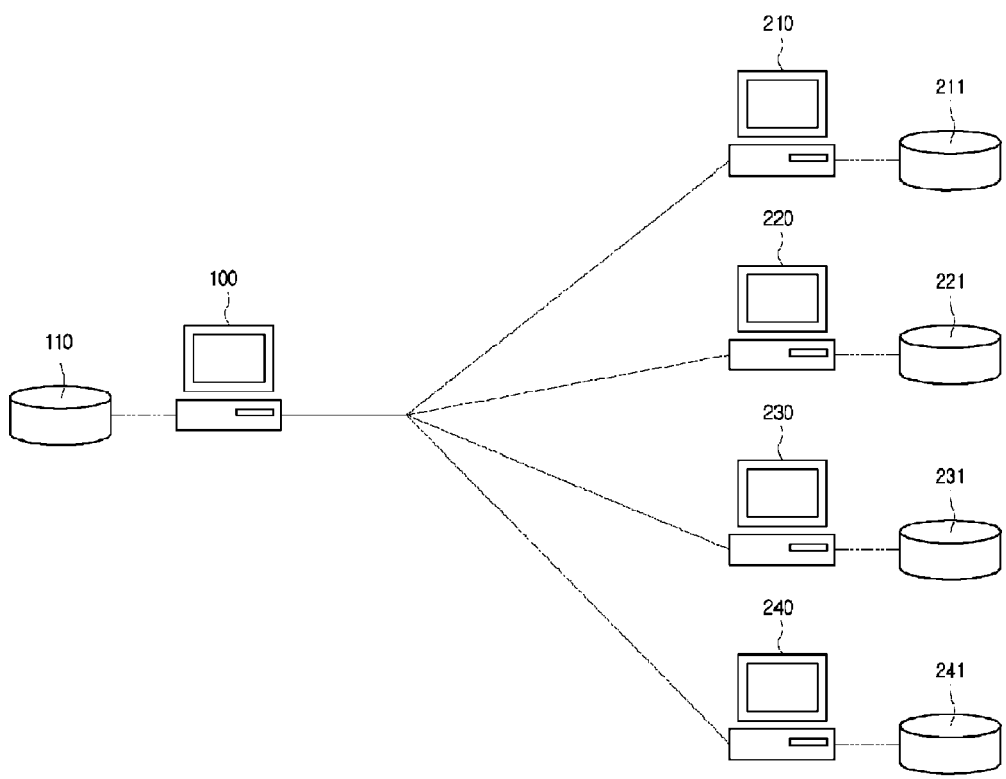

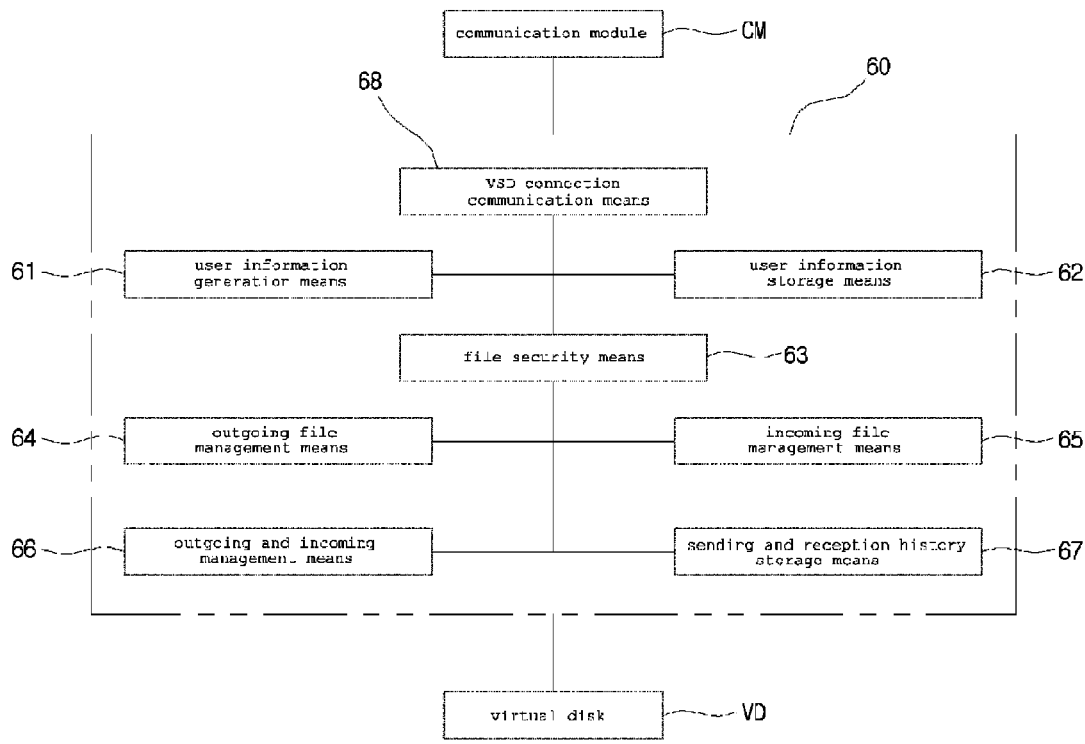
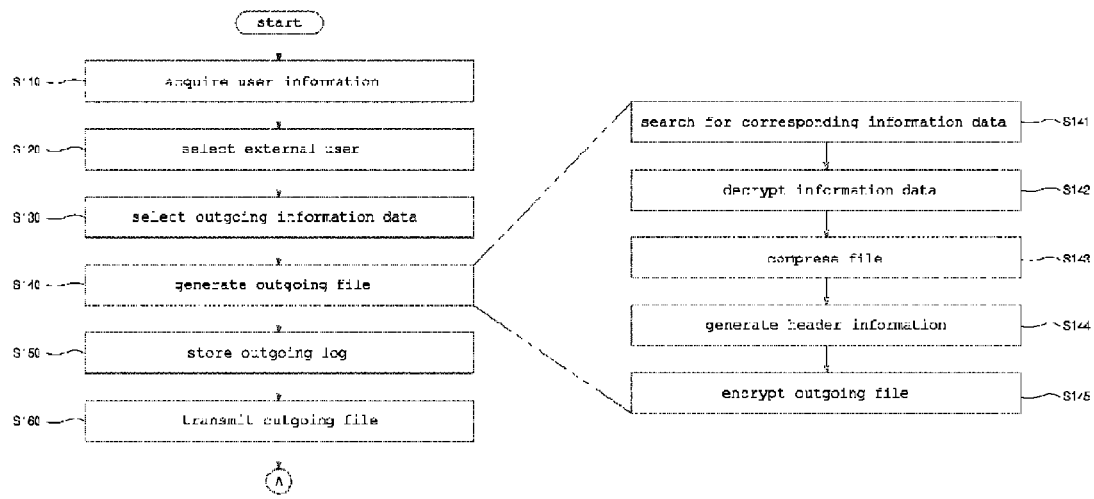

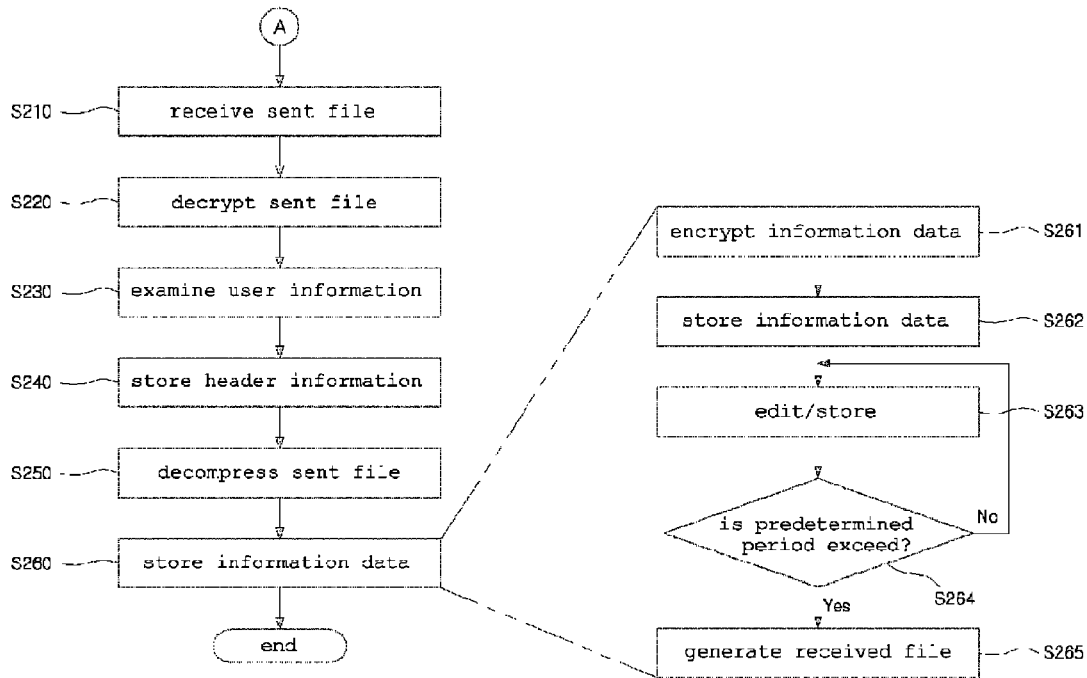
[Fig. 5]
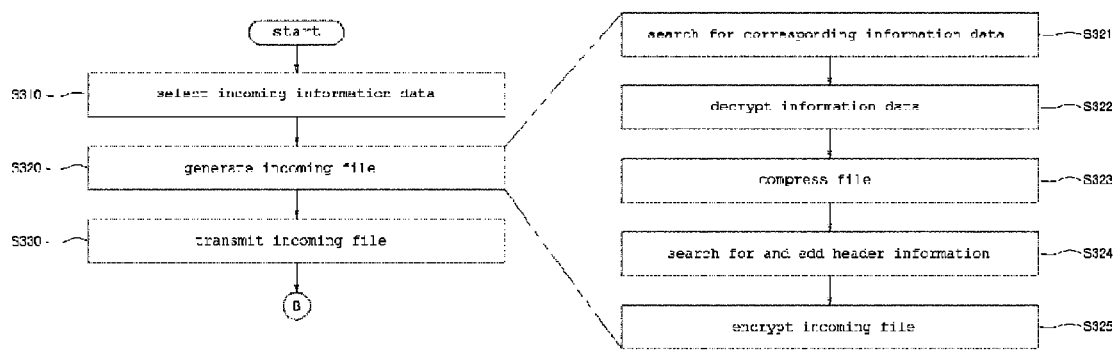
[Fig. 6]

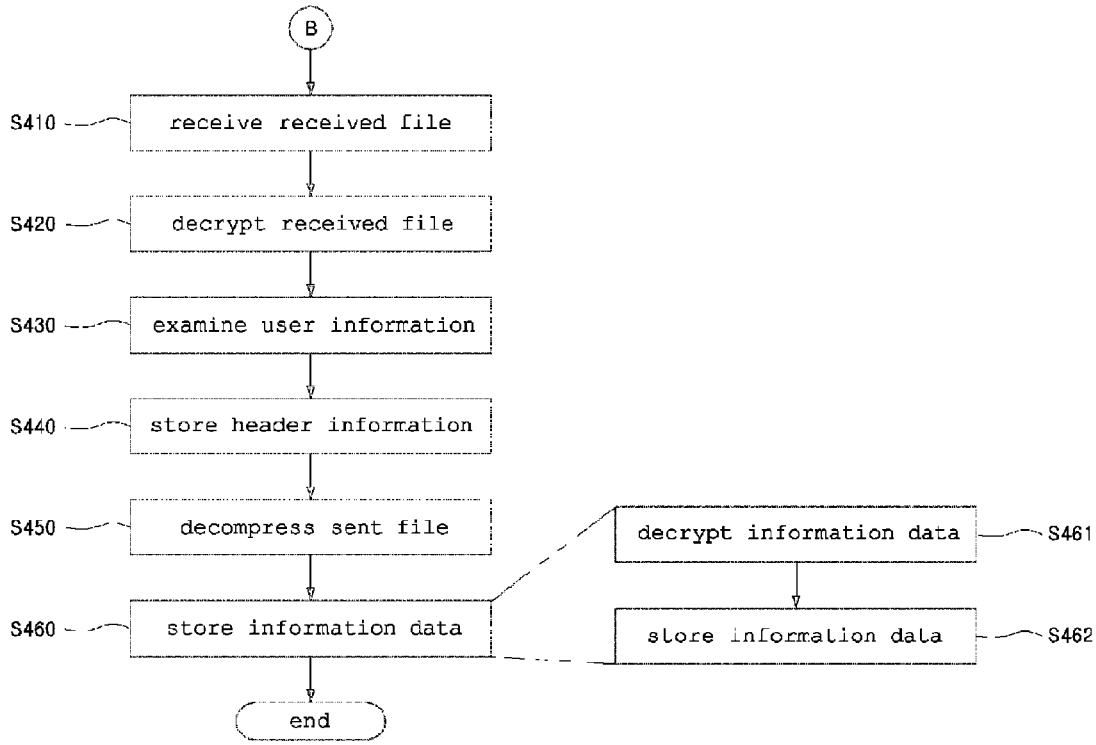
[Fig. 7]
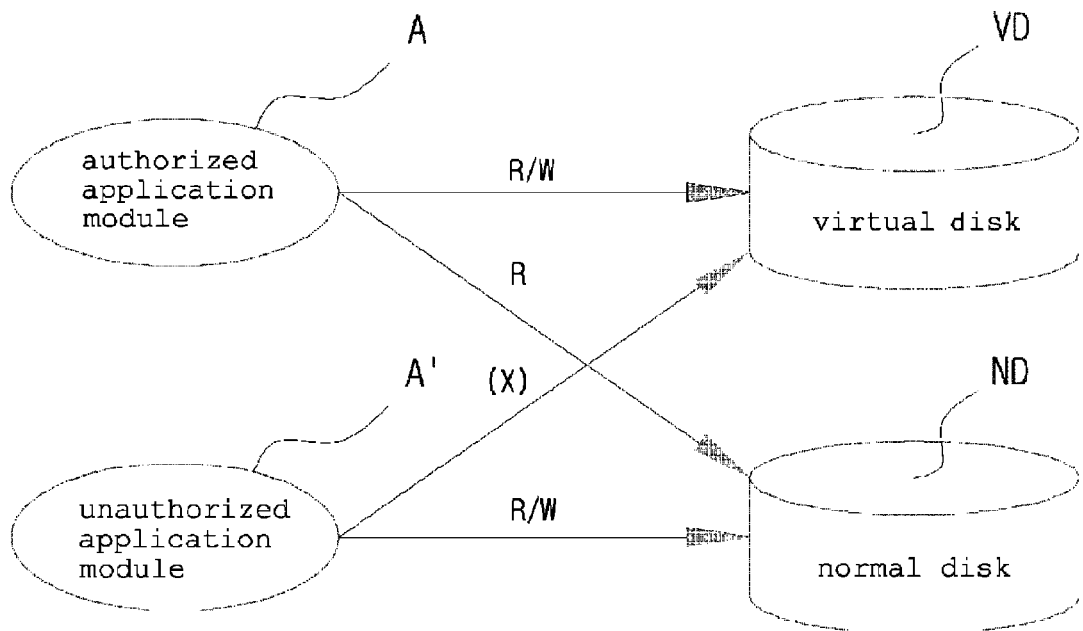
[Fig. 8]

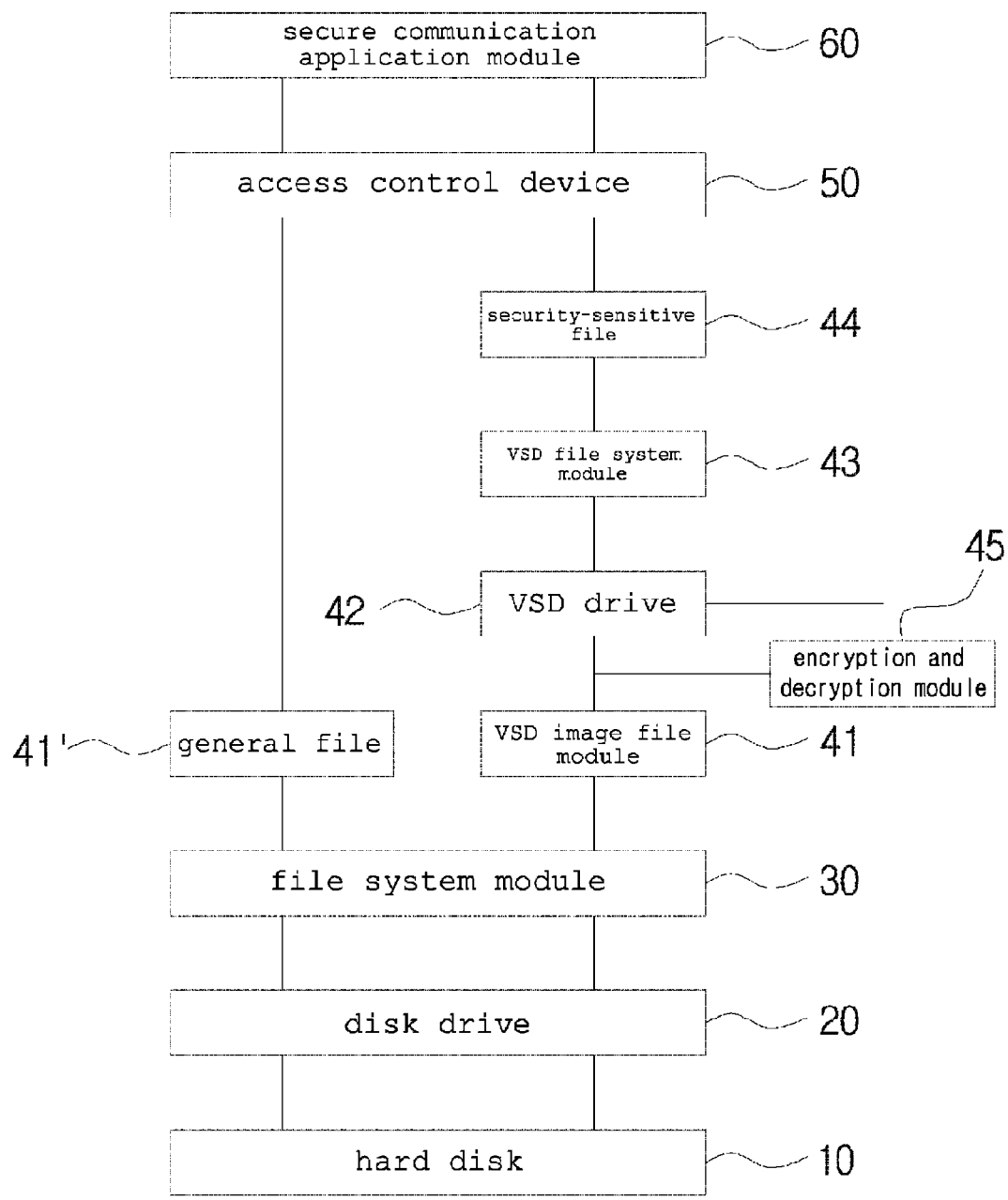
[Fig. 9]

[Fig. 10]
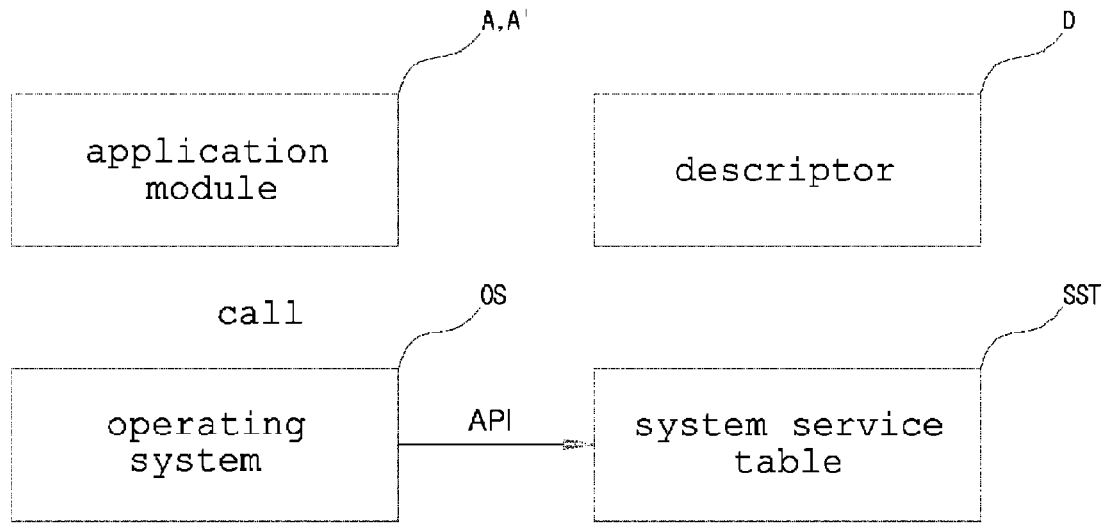
[Fig. 11]
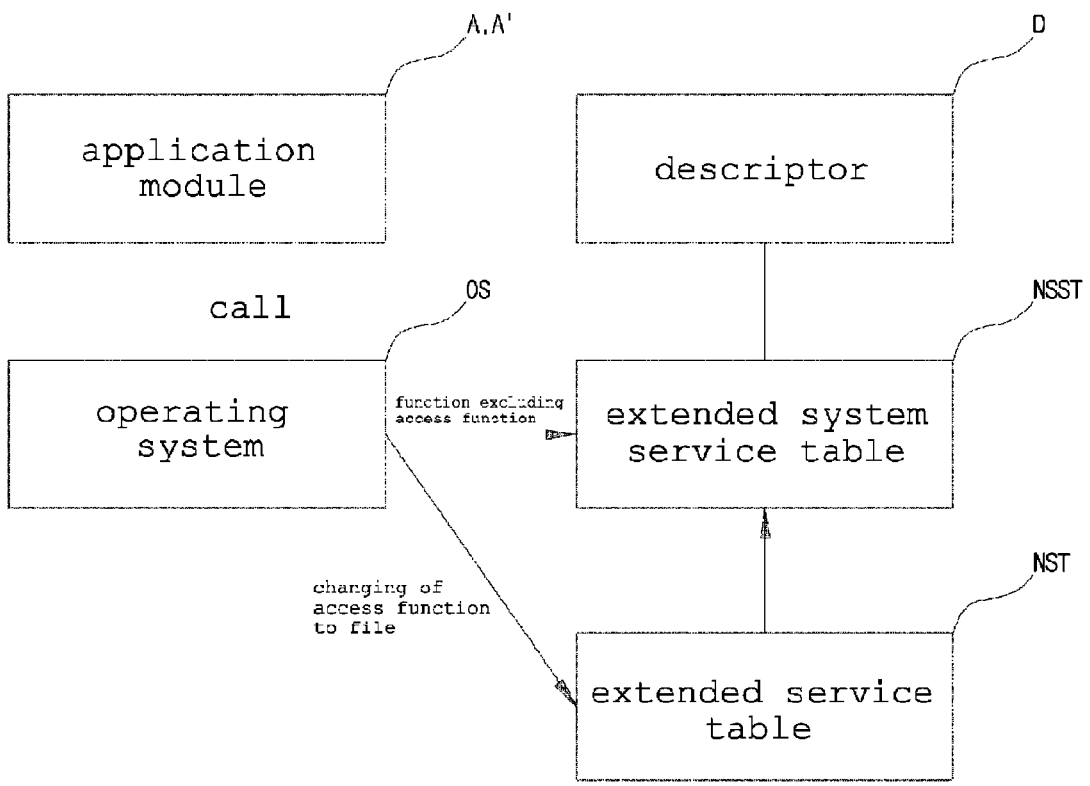

[Fig. 12]
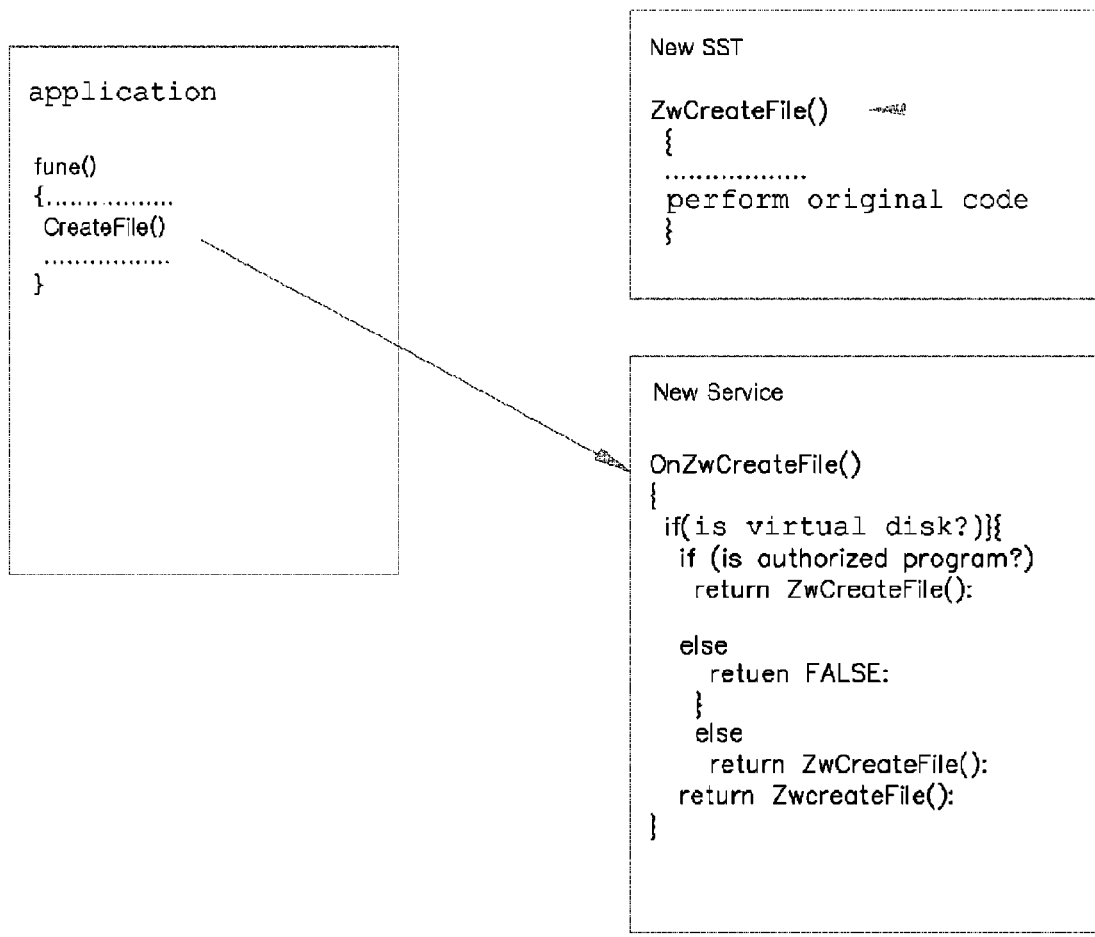

ELECTRICAL TRANSMISSION SYSTEM IN SECRET ENVIRONMENT BETWEEN VIRTUAL DISKS AND ELECTRICAL TRANSMISSION METHOD THEREOF

TECHNICAL FIELD

The present invention relates to a secure transmission system and secure transmission method that securely transmit data stored in a computer to different computers via a Local Area Network or the Internet and, more particularly, to a secure transmission system that sets up a virtual disk by designating a virtual area of a disk mounted in a computer and allows data stored on the virtual disk to be securely transmitted to a virtual disk of a different computer, and a secure transmission method using the same.

BACKGROUND ART

In planning business for creating profit or performing various types of research in the modern society, information and technologies related to corresponding business or research are shared between the experts or members of a corresponding field on condition that security is maintained, and corresponding information and technologies are temporarily disclosed to a third party according to need, so that the information and technologies can be developed into advanced information and technologies.

Although the disclosure of information and technologies (hereinafter referred to as information) on condition that security is maintained may be made through various mediates, the sharing of the information through computer communication is most common.

The sharing of information through computer communication can be achieved by transmitting data, in which the information is contained, to different computers through online communication. Since the prohibition of leakage for the corresponding information has been agreed between information sharers at the time of sharing information, conventional secure transmission system and secure transmission method are only configured such that hacking, which is performed during the transmission and reception of corresponding data, or reading, which is conducted by unauthorized persons, are impossible, under the assumption that there is no leakage of information from the information sharers.

However, there has been a case where an information sharer, who has agreed on security of the corresponding information, unintentionally or intentionally leaks the information to the outside through computer communication. In this case, the conventional secure transmission system and secure transmission method are problematic in that they do not provide against the danger of information leakage.

To aid understanding, conventional problems are described though examples of the conventional secure transmission system and secure transmission method below.

FIGS. 1a, 1b and 1c are conventional block diagrams illustrating a process of securely transmitting information through computer communication.

Referring to a conventional secure transmission process shown in FIG. 1a, information data stored in a file format is encrypted and transmitted to a destination computer. In this case, the information data is encrypted so as to be decrypted only through the input of a specific password in the encryption process, and the received information data can be decrypted in such a manner that the password is separately transmitted to an external user so that the external user receives and decrypts the encrypted information data.

That is, an internal user performs encryption such that corresponding information data is decrypted only through the input of a password, and transmits the encrypted information to an external user through computer communication using electronic (e)-mail or messenger. The password is separately transmitted online through on e-mail or messenger, or offline through telephone or correspondence. Accordingly, the external user can decrypt the corresponding information data.

However, the above-described process is problematic in that the security of the corresponding information may be defeated in the case where the encrypted information data and the password are leaked out by hacking, or the external user unintentionally or intentionally leaks out the decrypted information data through computer communication.

Referring to another conventional secure transmission process shown in FIG. 1b, although the process of the present example is similar to the above-described conventional secure transmission process, it differs from the above-described conventional secure transmission process in that corresponding information data is edited through an application program and is then automatically encrypted, so that nobody except for an external user can view the details thereof. However, this process cannot prevent the information data from being leaked out through computer communication by an external user, who knows the password required for the decryption of the encrypted information data.

Referring to another conventional secure transmission process shown in FIG. 1c, the process of the present example determines whether to perform decryption though user authentication, along with a password, as a means for decrypting encrypted information data.

That is, this process transmits a collection program, which is capable of fetching an external user's intrinsic information, to the external user, collects the intrinsic information, and then records the collected intrinsic information in encrypted information data, so that, even when the corresponding information data is decrypted, whether to perform decryption can be determined by examining the password and the coincidence of the intrinsic information. Furthermore, the corresponding information data is encrypted again when being edited and stored using an application program, so that nobody except for an external user can view the corresponding information.

Accordingly, although the external user intentionally leaks out the information data through computer communication, a third party who has received the information data cannot decrypt the encrypted information data using only a password for decryption due to mismatch of the intrinsic information contained in encrypted information data, so that a problem of security release committed by the external user can be overcome to some extent.

However, in the case where a new file format is made by storing the corresponding information data using a different name, the above-described process is defective in that the information data can be externally leaked out through computer communication. Furthermore, the present process may be effective for general office document files because a single file is independently processed. However, in the case where a single piece of complete information is achieved by linking a plurality of files with each other like Computer Aided Design (CAD) files or program development files, the present process is limited to the application thereof, and has limitation in that it cannot be applied to information data requiring the maintenance of actual security.

DISCLOSURE OF INVENTION

Technical Problem

Accordingly, the present invention has been made keeping in mind the above problems occurring in the prior art, and an object of the present invention is to provide a secure transmission system for transmitting data online between access-controlled virtual disks, which, in a security requiring process of transmitting and receiving information data through computer communication, that is, online communication, is capable of fundamentally preventing the leakage of the information data, which is committed by a user who has the authority to read the corresponding information data, as well as the leakage of the information data, which is attributable to the hacking of a third party, and a secure transmission method using the same.

Technical Solution

In order to accomplish the above object, the present invention provides a secure transmission system for transmitting data between access-controlled virtual disks online, the system including a virtual disk, configured to allow only an authorized application program module to gain an access and read, write and edit information data; and a secure communication application module including a user information generation means for generating intrinsic user information at the time of setting up the virtual disk, a user information storage means for storing the generated user information, an outgoing file management means for searching the virtual disk for information data to be sent and compressing the found information data, generating the header information of the information data in which user information about a sender and/or a recipient is contained, and adding the generated header information to the user information, an incoming file management means for reading the header information of received information data, decompressing compressed information data, and storing the decompressed information data on the virtual disk, and a file security means for encrypting and decrypting information data to be sent or received information data.

Furthermore, in order to accomplish the above object, the present invention provides a secure transmission method for transmitting data between access-controlled virtual disks online in a secure transmission system, the secure transmission system having a virtual disk, and a secure communication application module for mediating transmission and reception of information data between the virtual disk and a virtual disk of a different terminal, the method including the information data search step of searching for information data to be sent from the virtual disk; the information data decryption step of decrypting corresponding information data encrypted in the virtual disk to gain an access to the found information data; the file compression step of compressing the decrypted information data; the header information creation step of creating header information of information data in which user information about a sender and/or a recipient of the information data is contained; and the file encryption step of encrypting the compressed information data including the header information.

BRIEF DESCRIPTION OF THE DRAWINGS

FIG. 1 is a conventional block diagram illustrating a process of securely transmitting information through computer communication;

FIG. 2 is a schematic diagram showing a base construction, in which secure transmission is performed according to the present invention;

FIG. 3 is a block diagram showing the construction of a secure communication application module according to the present invention;

FIG. 4 is a flowchart illustrating a process of transmitting information data to an external user based on a secure transmission method according to the present invention;

FIG. 5 a flowchart illustrating a process of receiving information data from an external user based on a secure transmission method according to the present invention;

FIG. 6 is a flowchart illustrating a process of transmitting information data to an internal user a based on a secure transmission method according to the present invention;

FIG. 7 is a flowchart illustrating a process of receiving information data from an internal user a based on a secure transmission method according to the present invention;

FIG. 8 is a block diagram showing the drive relationship of a virtual disk according to the present invention;

FIG. 9 is a block diagram showing the construction of the virtual disk according to the present invention;

FIG. 10 is a block diagram showing the drive relationship of a conventional system service table;

FIG. 11 is a block diagram showing the drive relationship of a system service table applied to a security transmission system according to the present invention; and FIG. 12 is an example illustrating a process in which whether access to a corresponding file has been authorized by an application program (an application module) is processed according to the construction of FIG. 11.

MODE FOR THE INVENTION

The present invention is described in detail with reference to the accompanying exemplary drawings below.

FIG. 2 is a schematic diagram showing a base construction, in which secure transmission is performed according to the present invention, and FIG. 3 is a block diagram showing the construction of a secure communication application module according to the present invention. Descriptions are made with reference to FIGS. 2 and 3.

A security transmission system and secure transmission method according to the present invention allow information data to be transmitted and received between terminals combined on a local network basis or terminals located at remote locations via the Internet, and prevents the corresponding information data from being hacked, or from being leaked out due to intentional disclosure committed by a sharer.

As shown in FIG. 2, a contracting party transmits information data, which is stored in a its own contracting party terminal 100, to contractor terminal 210, 220 and 230 and 240, and allows a corresponding task to be performed according to order. In this case, the information data must not be leaked out because the security of the information data must be maintained. For this purpose, the secure transmission system according to the present invention respectively creates virtual disks 110, 211, 221, 231 and 241 for hard disks that exist in the terminals 100, 210, 220, 230 and 240, and allows the information data, which is transmitted and received online, to be read from, written on, and edited on the virtual disks 110, 211, 221, 231 and 241. In this case, an application program that enables access to the corresponding information data may be selected.

Meanwhile, the contracting party terminal 100 can operate in conjunction with one or more contractor terminals 210, 220, 230 and 240. Accordingly, the contracting party can select a contractor who will make an order according to the type and detail of a contracting task, and transmit corresponding information data.

In order to send and receive information data, the installation of the virtual disks 110, 211, 221, 231 and 241, as described above, must precede, and the virtual disks 211, 221, 231 and 241 must be essentially installed even on the contractor terminals 210, 220, 230 and 240, which will receive information data according to order, as well as in the contracting party terminal 100.

Although a description will be made again below, the preceding task of installing a virtual disk may be omitted for a contractor who has performed one or more transactions because corresponding data remains in the contracting party terminal 100. In the case where information data for making an order to a new contractor is transmitted, a virtual disk and secure communication application module 60 according to the present invention is first installed, and then the secure transmission of corresponding information data must be executed.

The secure transmission system according to the present invention includes a virtual disk, configured to allow only an authorized application program module to gain an access and read, write and edit information data; and a secure communication application module 60 including a user information generation means 61 for generating intrinsic user information at the time of setting up the virtual disk, a user information storage means 62 for storing the generated user information, an outgoing file management means 64 for searching the virtual disk for information data to be sent, generating the header information of the information data, in which user information about a sender and/or recipient is contained, a incoming file management means 65 for reading the header information of reception information data, and identifying corresponding information data, and a file security means 63 for encrypting and decrypting sending information data or reception information data.

When the virtual disk according to the present invention is installed on a computer (a terminal), the user information generation means 61 requests information about a user accessing a current virtual disk, and/or information about a user using the corresponding computer, in a installation process, and the user who is performing the installation inputs requested information in response to the request. When the input is completed, the user information generation means 61 creates the intrinsic IDentification (ID) of the virtual disk, and the created intrinsic ID is stored in the user information storage means 62. The intrinsic ID forms the header information, along with the customer information.

In the embodiment of the present invention, the intrinsic ID is newly created every time the virtual disk is installed, so that intrinsic IDs can be criteria for intrinsically identifying virtual disks respectively installed on different terminals. Meanwhile, the intrinsic ID and the customer information (hereinafter "user information") is updated to new information according to the type and detail of sending and reception information data, and header information, which is a character string (a character string of 228 characters in the present invention) in which the pieces of information and the customer information are contained, is created. The header information is described in more detail below.

The secure transmission system according the present invention determines whether a newly received reception file is genuine, and whether a recipient has the authority to read through the search of customer information previously stored in the user information storage means 62.

When transmitting the information data stored on the virtual disk to a virtual disk installed on a different terminal online, the outgoing file management means 64 performs a task of packing the information data such that the corresponding information data is prevented from being leaked out in a transmission process due to hacking, and is prevented from being intentionally leaked out online to a third party due to a malicious recipient.

The incoming file management means 65 examines a received file received from a different virtual disk online, determines whether the reception file packed by the virtual disk operating in conjunction with the outgoing file management means is genuine, and whether the recipient has the authority to read, and then performs an unpacking task.

The file security means 63 performs encryption and decryption on files transmitted online.

Thereafter, the security transmission system according to the present invention may further include a sending and reception time management means 66 for including sending and reception time information in the header information of the information data such that the outgoing file management means 64 for sending corresponding information data operates, when a staying period of information data received in a virtual disk of a different terminal exceeds a predetermined period.

Once a predetermined period is exceeded even though the information data has been transmitted to the contracting party and the corresponding information data is disclosed under the condition of security maintenance, it is not allowed for the contractor to read the information data, so that the possibility of leakage of the information data can be minimized. The sending and reception time management means 66 can determine a period in which the corresponding information data can stay in the different virtual disk, and can add the period to the header information generated by the outgoing file management means 64.

When information data having information about the staying period is stored on the virtual disk provided in the terminal of the contractor and the corresponding period is exceeded, the outgoing file management means 64 of the secure communication application module 60 installed on the terminal of the contractor automatically operates, and preparations for sending the information data is made.

A sending and reception history storage means 67, in which the sending and reception histories of the information data are stored, may be further included. This cumulatively stores the sending and reception details of the information data transmitted to the contractor, and allows the contracting party (user) to easily manage the transmission and reception of the information data.

The secure communication application module 60 may further include a Virtual Secure Disk (VSD) connection communication means 68 for mediating transmission and reception of user information, and outgoing and incoming files, which are stored on the virtual disk while directly communicating with a virtual disk provided in a different terminal online.

The secure communication application module 60 may not perform communication by itself. That is, a reception file to be sent to the contractor may be generated by the outgoing file management means 64 and transmitted to the contractor through an e-mail or messenger, that is, a different communication medium. Thereafter, the contractor receives the sent file attached and transmitted through the e-mail or message, stores the reception file in his/her computer in which a virtual disk is installed, and executes the secure communication application module 60, so that access to the sent file is made.

However, the secure communication application module 60, other than such a scheme, further includes the VSD connection communication means 68, so that it can communicate with a secure communication application module installed on a different terminal, while not passing though a separate communication medium, and can receive the sent file and store it on the virtual disk. Meanwhile, the VSD connection communication means 68 allows customer information about a contractor, which is generated by the customer information generation means 61 as well as the transmission and reception of the outgoing and incoming files, to be received by the contracting party without passing though a separate communication medium.

For the more detailed description of the secure transmission system according to the present invention, a secure transmission method according to the present invention is described in conjunction with the secure transmission system below.

FIG. 4 is a flowchart illustrating a process of transmitting information data to an external user based on the secure transmission method according to the present invention. A description is made with reference to FIG. 4.

1) User Information Acquisition Step S110

A contracting party makes an order from a contractor and transmits needed information data online. In this case, the information data has been stored on the virtual disk 110 of the contracting party terminal 100, and includes details, the security of which must be maintained. Accordingly, the virtual disks 211, 221, 231 and 241 must be installed on the contractor terminals 210, 220, 230 and 240 for receiving the corresponding information data. For this purpose, a contracting party transmits the installation programs of the secure communication application module 60 and the virtual disk to the contractor, and the contractors, who have received the programs, install the programs in their own terminals 210, 220, 230 and 240.

The contractor who has received the installation programs runs the programs and installs them on their own terminals 210, 220, 230 and 240. In this case, customer information is requested in the installation process. The customer information may be personal information, such as the address, name, telephone number, and resident registration number of a user, and the user may be a natural person or a corporation.

When the input of the customer information is completed, the customer information generation means 61 generates the intrinsic ID of the virtual disk, forms user information in which the customer information and the intrinsic ID are contained, and stores the customer information in the user information storage means 62. In this case, the virtual disks 211, 221, 231 and 241 are respectively installed on the contractor terminals 210, 220, 230 and 240 while the process is performed.

Meanwhile, each of the contractors transmits the generated user information to the contracting party terminal 100. This may be performed through e-mail or messenger, this is, a communication medium that is separately operated from the secure transmission system according to the present invention. As described above, in the embodiment of the secure transmission system according to the present invention, the user information is represented by a single character string and is transmitted through e-mail or messenger without change. A contractor, who has received the character string, inputs to the customer information generation means 61 of the secure communication application module 60 installed on the contracting party terminal 100. In this case, the character strings, which are intrinsic prescription and logic, are abstractly formed of characters and/or numbers, so that details thereof cannot be interpreted using the corresponding character string.

Meanwhile, the customer information generation means 61 interprets the corresponding character string, adds the personal data of a corresponding contractor to a list of contractors, and stores the added result in the user information storage means 62, so that the character string can be used as a criterion for determining whether a incoming file to be transmitted from the contractor terminal 210, 220, 230 or 240 is genuine and whether the authority to read is granted.

In addition, it is allowed for customer information about a contractor to be directly transmitted from the contractor terminals 210, 220, 230 or 240 to the contracting party terminal 100 though the VSD connection communication means 68. That is, when the input of customer information requested at the time of installing the virtual disk of a contractor is completed, the user information generation means generates the intrinsic ID of the virtual disk and, at the same time, creates user information, and inquiries "Do you want to transmit customer information?" to the corresponding contractor.

In this case, the contractor executes transmission and, therefore, the corresponding user information is immediately transmitted to the contracting party terminal 100. The secure communication application module 60 installed on the contracting party terminal 100 receives the user information and stores it in the user information storage means 62.

However, the proposed method is only an embodiment according to the present invention, and may be variously modified and implemented within a range without departing from the below-described claims.

2) External User Selecting Step S120

The contracting party selects one of the contractors stored in the user information storage means 62 and makes preparations for transmitting the information data. In this case, the term 'external user' refers to a user using a remote terminal that must perform communication using the Internet, not a user using terminals combined on a local network basis. However, the virtual disk according to the present invention is executed in a state in which it is limited to only a single terminal, so that the selection of users using terminals connected to an adjacent network, that is, the selection of internal users may, be possible. Since the transaction between an enterprise to which the contractor belongs and different external users may be frequently conducted in the case where an outside order is offered, the present name is defined to represent this case.

3) Outgoing Information Data Selecting Step S130

Of pieces of information data stored on the virtual disk 110 of contracting party terminal 100, information data to be transmitted to the contractor terminals 210, 220, 230 and 240 of external users (hereinafter "contractors" selected at the external user selection step S120 is selected.

In this case, the information data is stored in the virtual disk 110 in a file format, so that a plurality of file formats may be selected.

4) Outgoing File Generating Step S140

When information data to be sent through the external user selection step S120 and the reception information data selection step S130, and the contractor terminals 210, 220, 230 and 240, to receive corresponding information data are determined, the outgoing file management means 64 searches the virtual disk 110 and accesses the information data, and then performs the following process.

(1) Corresponding Information Data Searching Step S141

The outgoing file management means 64 searches for the information data stored in the VSD image file module 41 through a VSD file system module 43 (refer to FIG. 9) and accesses it.

(2) Information Data Decrypting Step S142

Since the information data stored in the VSD image file module 41 has been encrypted, the outgoing file management means 64 causes the information data to be encrypted though the encryption and decryption module 45 and, therefore, allows the information data to be externally indicated by an Operating System (OS).

(3) File Compressing Step S143

The information data exists in a file format. Accordingly, the outgoing file management means 64 reduces the size of the sent file and performs file compression so as to be decompressed though the examination of the customer information.

(4) Header Information Generating Step S144

The outgoing file management means 64 searches for the customer information about a contractor, which is previously selected by the user information storage means 62, respectively collects the reception type and/or details of the corresponding information data, and time information about a staying period from the sending and reception time management means 66, and adds the collected results to the header of the compressed information data file.

(5) Outgoing File Encrypting Step S145

The file security means 63 decrypts the outgoing file that finishes compression and the insertion of header information, and prepares for hacking that may occur during a transmission process. That is, a third party cannot read the outgoing file even though the corresponding outgoing file is leaked to the third party by hacking, so that the outgoing file can be secured. In this case, protection is guaranteed in a customer information examination process for decompressing compression even though decryption has succeeded, so that the corresponding information data can be securely transmitted online.

5) Outgoing Log Storing Step S150

Once a preparation for transmitting the information data to the contractor terminals 210, 220, 230 or 240 is completed, the corresponding outgoing file is stored in the sent and received history storage means 67.

6) Outgoing File Transmitting Step S160

The outgoing file that finishes transmission preparation is transmitted in the form of an added file or a transmission file though e-mail or messenger. However, as the VSD connection communication means 68 is further included, the virtual disk 110 of the contracting party terminal 100 can be directly connected to the virtual disk 211, 221, 231 or 241 of the contractor terminal 210, 220, 230 or 240 that will receive the corresponding sending file and can immediately transmit the sending file.

FIG. 5 a flowchart illustrating a process of receiving information data from an external user based on a secure transmission method according to the present invention. A description is made with reference to FIG. 5.

1) Sent File Receiving Step S210

The contractor terminal 210, 220, 230 or 240 receives the sent file transmitted from the contracting party terminal 100.

2) Sent File Decrypting Step S220

The secure communication application module 60 of the contractor terminals 210, 220, 230 or 240, which has received the encrypted, sent file performs decryption though the file security means 63.

3) User Information Examination Step S230

The incoming file management means 65 reads header information contained in the decrypted, sent file, and examines whether the contractor who has received the sent file has the authority to read it.

This is performed by comparing the user information contained in the header information with the user information of the user information storage means 62 of the secure communication application module 60 installed on the contractor terminals 210, 220, 230 or 240. In this case, the user information may be user information about a contractor, so that the user information contained in the sending file may be the user information about a contractor. However, the user information about a contractor may be further included in order to strengthen security and allow the contractor to record the sending and reception history of the information data.

4) Header Information Storing Step S240

Once it is determined that the corresponding contractor has the authority to read the information data though the examination of the user information, the header information can be stored in the sending and reception history storage means 67 of the contractor terminals 210, 220, 230 and 240. However, in the case where time information about a staying period is contained in the header information, the corresponding header information must be stored to restrain the staying period.

5) Sent File Compression Decompressing Step S250

The incoming file management means 65 decompresses the compressed, sent file and, thereby, allows the OS of the contractor terminal 210, 220, 230 or 240 to detect the details of the information data.

6) Information Data Storing Step S260

When the compression of the sent file is decompressed, the incoming file management means 65 accesses the virtual disk 211, 221, 231 or 241 and performs the following process.

(1) Information Data Decrypting Step S261

The incoming file management means 65 encrypts the corresponding information data through the encryption and decryption module 45.

(2) Information Data Storing Step S262

The encrypted information data is stored in the VSD image file module 41 through the VSD file system module 43.

(3) Editing/Storing Step S263

The contractor searches for the information data through an application program module authorized to access the virtual disk 211, 221, 231 or 241, and performs read, write and edit functions.

(4) Period Elapse Examination Step S264

In the case where time information is contained in the header information, the staying period of the corresponding information data in the contractor terminals 210, 220, 230 or 240 is limited. Accordingly, when the staying period does not exceed a predetermined period, the editing/storing step S263 can be performed. In contrast, when the staying period exceeds the predetermined period, the outgoing file management means 64 is aware that the predetermined period is exceeded and makes a preparation for transmitting the corresponding information data.

(5) Sent File Generating Step S265

Since the present step is the same as the above-described sent file generation step S140, description thereof is omitted.

FIG. 6 is a flowchart illustrating a process of transmitting information data to an internal user based on a secure transmission method according to the present invention, and FIG. 7 is a flowchart illustrating a process of receiving information data from an internal user based on a secure transmission method according to the present invention. Descriptions are made with reference to FIGS. 6 and 7.

FIG. 6 illustrates a process of returning information data from the contractor terminals 210, 220, 230 or 240 to the contracting party terminal 100 due to completion of contractor's work, lapse of a period or the like.

At this time, definitions of the terms 'send' and 'receive' are given. When the transmission and reception of information data are performed based on the contracting party terminal 100, the case where the information data is transmitted from the contracting party terminal 100 to the contractor terminals 210, 220, 230 or 240 is defined as the term 'send,' and the case where the information data is transmitted from the contractor terminals 210, 220, 230 or 240 to the contracting party terminal 100 is defined as the term 'receive.'

Accordingly, the terms 'send' and 'receive' described in FIGS. 4 to 7 can be understood.

The transmission and reception of the information data previously described in conjunction with FIGS. 4 and 5 are almost the same as those to be described in conjunction with FIGS. 6 and 7, and the latter are different from the former in that the user information acquisition step S110 of acquiring the user information about contractor and the external user selecting step S120 of the contracting party or selecting any one of the contractors may not be performed.

Meanwhile, in the transmission of information data from the contractor terminals 210, 220, 230 and 240 to the contracting party terminal 100, there is no difference between the embodiment in which the corresponding information data is transmitted and received though e-mail or messenger, that is, a separate communication medium, according to whether the VSD connection communication means 68 exists, and the embodiment in which the corresponding information data is transmitted and received through direct communication between the virtual disk 110 of the contracting party terminal 100 and the virtual disks 211, 221, 231 and 241 of the contractor terminals 210, 220, 230 and 240. Each means introduced in the instant application is preferably an application program facilitating performance of the system and method, where the means appears in the user information generation means 61, the user information storage means 62, the file security means 63, the outgoing file management means 64, the incoming file management means 65, the sending and reception time management means 66, the sending and reception history storage means 67, and the VSD connection communication means 68.

In order to avoid a repeated description, a further description does not made below.

Meanwhile, a description of the virtual disk is made below.

FIG. 8 is a block diagram showing the drive relationship of a virtual disk according to the present invention. A description is made with reference to FIG. 8.

The virtual disk according to the present invention selectively permits application programs A and A' (hereinafter "application module") accessible to security-sensitive data (hereinafter "file") (hereinafter a series of operational process for a corresponding file to perform tasks of open, read, and write) without the separate input of a password or a process of identifying the person as himself/herself, such as an authentication examination procedure at the time of access of an internally authorized person, so that access to the file is freely made by only by an authorized application module A.

Meanwhile, a virtual disk, which allow an OS to recognize a fact that a disk drive is created without physically partitioning a hard disk (hereinafter commonly designated as an upper-class concept, including a DataBase (DB) along with the hard disk of a general Personal Computer (PC), even though it is named DB in a server class), is installed and, thereby, the locations of a disk to which authorized application module A and unauthorized application module A' are accessible are distinguished from each other. A concept regarding the virtual disk is described in more detail below.

Accordingly, as shown in FIG. 8, the authorized application module A accesses the virtual disk in which only security-sensitive files are stored and executes Read/Write R/W. In contrast, the unauthorized application module A' cannot execute both R/W for the security-sensitive files stored on the virtual disk (X), but can execute Read/Write R/W for files stored on a normal disk other than the virtual disk.

Meanwhile, in the authorized application module A, Read for files stored on the normal disk can be executed, but Write cannot be executed. This is to prevent the security-sensitive files stored on the virtual disk e from being externally leaked out.

FIG. 9 is a block diagram showing the construction of the virtual disk according to the present invention. The virtual disk according to the present invention is described in more detail with reference to FIG. 9 below.

The access control system according to the present invention has a structure including a hard disk 10, a disk drive 20, a file system module 30, an application module 60, a VSD image file module 41, a VSD drive 42, an encryption and decryption module 45, a VSD file system module 43, and an access control module 44.

The hard disk 10 basically stores various application programs, driven under a PC or Local Area Network (LAN) base, and data to be processed by the application programs, and the data are managed in file formats by Read, Delete and Edit operations using an OS. Since the detailed physical/chemical structure of the corresponding hard disk 10 and an operational relationship between the hard disk and the OS are well known, detailed descriptions thereof are omitted.

The disk drive 20 mediates between the hard disk 10 and the OS. It is necessary to partition the hard disk 10 according to need. In this case, the disk drive 20 includes one or more disk volumes that are recognized by the OS through the format of the hard disk 10, and the OS recognizes the disk volumes as individual disks and manages them.

Since the disk drive 20 is also a well-known component, a detailed description thereof is omitted.

The file system module 30, which abstracts the physical characteristics of the hard disk 10, arranges the abstracted physical characteristics on a logical storage unit basis (cluster), and processes access to files, is installed along with the disk volumes formed by disk formatting. Accordingly, the OS can recognize the disk drive 20 based on the disk volumes.

For reference, the file system module 30 includes FAT16, FAT32, and NTFS based on Windows, that is, a computer OS developed by Microsoft Corporation, and ext2, raiserFS, and ext3 based on Linux. In an embodiment according to the present invention, the present access control system is implemented based on Windows employed as a basic OS, so that the file system module 30 employs FAT series and NTFS. However, this is only an embodiment, and may be modified and implemented within a range without departing the below-described claims. In the VSD image file module 41, the storage space may be formed in a variable manner, not in a fixed manner, and the file system module 30 for supporting this manner is limited to NTFS in an NT series, so that it can operate only under an NTFS basis in the case where the VSD image file module 41 is formed in a variable manner. However, this is only one of numerous embodiments, and may be modified and implemented within a range without departing the below-described claims.

The application module 60 is a general application program that is configured to fetch and execute files stored in the disk volume. In the present invention, the application module 60 is classified into a case where access to the virtual disk is authorized and a case where access to the virtual disk is not authorized, so that a process of processing the security-sensitive files can be varied.

The application module 60 is classified according to intrinsic information (program names, headers, checksums, or certificates of authentication), and the access control module 50 determines whether the application module 60 is authorized based on the information.

The VSD image file module 41 is formed by creating a separate file on the disk volume using the file system module 30. Furthermore, the VSD image file module 41 partitions a predetermined space on the hard disk 10, like the disk volume and, therefore, forms another virtual disk volume on the disk volume.

That is, unlike a method of forming disk volumes through a physical partition of the hard disk prior to the implementation of an OS, like existing disk partitioning, and setting up the file system module in the OS according to the corresponding disk drive including the disk volumes, the control system according to the present invention can achieve an effect identical to that of partitioning a hard disk according to a user's need on a PC and a LAN implemented through the OS.

However, in the case where the VSD image file module 41 is configured in a variable manner, the space used can be flexibly variable unlike the VSD image file module in an application previously filed by the present applicant, entitled "Access Control System For Each Application Program Using Virtual Disk and Control Method Thereof (Korean Pat. Appl. No. 10-2004-0012380).

For example, in a conventional VSD image file module, when the VSD image file module, having a capacity of 10 GigaBytes (GB) and used for separately managing security-sensitive files, is formed on a hard disk whose total physical capacity is 40 GB, general files, for which security is not necessary, are stored in the remaining space of 30 GB. Accordingly, general files cannot be stored on the hard disk above 30 GB even if only a security-sensitive file having a size of 1 GB is stored in the VSD image file module and a margin space of 9 GB remains.

However, in the case where, as an embodiment, a variable type VSD image file module 41, having a capacity of 10 GB and used for separately managing security-sensitive files, is formed on a hard disk whose total physical capacity is 40 GB, general files can be stored up to 39 GB if only a security-sensitive file having a size of 1 GB is stored on the VSD image file module 41 occupying a space of 10 GB.

For this purpose, in the present invention, a sparse file applied under an NTFS (NT file system) basis is applied.

When it is necessary to arbitrarily make a giant file, the sparse file enables this without designating a disk space for all bytes.

That is, in the case where it is necessary to make a giant file of 42 GB, data is only written in a space of 64 KB, corresponding to the front portion of a file, and a space of 64 KB, corresponding to the end portion of the file, without designating all the disk space of 42 GB. The NTFS allocates a physical disk space to a file portion in which a user writes data and, thereby, the sparse file only uses a space of 128 KiloBytes (KB) in the disk. However, from a different point of view, the OS recognizes the file as a file having a size of 42 GB.

The VSD image file module 41 formed in a variable manner employs the above-described sparse file, which is described in more detail with a description of the VSD drive 42.

In this case, the VSD, which is an abbreviation of Virtual Secure Disk, refers to a virtual disk created to store security-sensitive files in the present invention, and is used for distinction with an existing hard disk.

Meanwhile, in the VSD image file module 41, the term 'image' implies one that does not actually exist but is apparently expressed, and is used to name an existing construction formed of a file system module 30 and a disk drive 20 and the virtual disk.

The VSD drive 42, which is a drive for the VSD image file module 41, is configured to correspond to the disk drive 20. That is, the VSD image file module 41 is formed in the concept of a file, like an actual general file 41', but the VSD image file module 41 must be recognized as a disk volume separately partitioned on the OS. Accordingly, the VSD drive 42 for processing files stored in the VSD image file module 41 is necessary.

The VSD drive 42 is installed along with a format for forming the VSD image file module 41, and the authorized application module A accesses security-sensitive files located at the VSD image file module 41 using the VSD drive 42.

The VSD file system module 43 is recognized as a new disk volume in the OS due to the creation of the VSD image file module 41 and the VSD drive 42, and is set up so as to process access to files provided in the VSD image file module 41.

Accordingly, the VSD file system module 43 is configured so as to correspond to the file system module 30.

The encryption and decryption module 45 performs encryption and decryption on the input and output of data between the VSD image file module 41 and the VSD drive 42. When the input/output data of the VSD drive 42 is stored in the VSD image file module 41 without change, the VSD image file module 41 is processed in the format of the corresponding file system module 30, so that all pieces of information about security-sensitive files existing in the VSD image file module 41 can be leaked out, therefore encryption and decryption must be performed when the VSD drive 42 performs input from/output to the VSD image file module 41. That is, the security-sensitive file is not in a state in which it has been decrypted in the VSD image file module 41, so that information is maintained without change while the location thereof is not known, therefore complete security can be achieved.

For example, when the WRITE command of the VSD file system module 43 is transferred to the VSD drive 42, data to be written is encrypted on a sector unit basis and is then stored in the VSD image file module 41. When a READ command is transferred, the data is read on a sector unit basis by the VSD image file module 41, is decrypted, and is then transmitted to the VSD file system module 43.

By doing so, the security-sensitive files existing in the VSD image file module 41 cannot be disclosed because the details of files are encrypted even if the VSD image file module 41 is leaked out.

In the present invention, a symmetric key type of encryption and decryption method is adopted. Such a block scheme performs encryption and decryption while forming locks on a sector unit basis, that is, 512 B, with respect to the disk.

Meanwhile, the security-sensitive file 44 is a file stored in the VSD image file module 41, and refers to a file for which security is required.

Furthermore, the virtual disk refers to the VSD image file module 41 and the VSD drive 42.

Meanwhile, when the application module 60 accesses files stored in the disk drive 20 and the VSD drive 42, the access control device 50 determines whether a space in which a corresponding take is performed is the disk drive 20 or the VSD drive 42, and determines access by determining whether the application module 60 is authorized for access to a corresponding file.

Generally, when the application module receives a request for a certain service, Windows (that is, NT 3.5 and 4.0, 2000, or XP as NT series) provides the service through the system service table SST. For example, when an arbitrary application module opens this file or a registry key, the application module uses a Win32 API called CreateFile( ). Such an API is implemented the most basic function that belongs to Kernel32.dll, and the OS provides ZwCreateFile( ) to the system service table SST via NtCreateFile( ) (NTDLL.dll) when CreateFile( ) (Kernel32.dll) is called by the application module A or A'.

FIG. 10 is a block diagram showing the drive relationship of a conventional system service table. As shown in FIG. 10, when the application module A or A' calls a necessary function to access a file necessary for execution, the OS provides a corresponding function to the system service table SST and, thereby, allows pointing to be performed through the descriptor D. Accordingly, the application modules A and A' are implemented to be compatible under the OS.

Meanwhile, as shown in FIG. 11 (a block diagram showing the drive relationship of a system service table applied to a security transmission system according to the present invention), in the access control system according to the present invention, the existing system service table SST is replaced with the extended system service table NSST and the extended service table NST is further included to this, the process, shown in FIG. 12 (an example illustrating a process of determining whether access to a corresponding file has been authorized by an application program (an application module) according to the construction of FIG. 11), is performed.

When the application module A or A' calls a necessary function to the OS to access a file necessary for execution, the OS provides a corresponding function to the extended service table NST and allows the following operation to be performed.

First, when the application module A or A' calls a function regarding CreateFile( ), the OS provides ZwCreateFile( ) to the extended service table NST through NtCreateFile( )(ntdll.dll). In this case, the extended service table NST changes ZwCreatFile( ) into OnZwCreateFile( ) (function set to prevent the performance of a corresponding function in the present invention), and then determines whether the operation of the corresponding function has been performed in the extended system service table NSST through logic.

In an embodiment according to the present invention, the function OnZwCreateFile( ) prevents the descriptor from performing pointing, as ZwCreateFile( ) is immediately provided to the extended system service table NSST when the corresponding function CreateFile( ) is requested. For this purpose, the function OnZwCreateFile( ) changes an address so that the sequent OnZwCreateFile( ) of the extended system service table NSST is performed when the corresponding function CreateFile( ) is requested. Thereafter the logic is performed, and the pointing by the descriptor D is not performed before the logic is completed. In this case, the arbitrarily created function OnZwcreatefile( ) is a function that is formed by changing/replacing the function that has previously existed in the conventional system service table SST as the extended service table NST is further installed in the present invention.

Meanwhile, the logic determines whether a file that is an object of the called function is located in the virtual disk or in a normal disk, and whether the application module A or A' calling the function is authorized, so that, as shown through an example, if it is determined that the file is located in the virtual disk, and a module calling is the authorized application module A, ZwCreateFile( ), which is a non-changed function, is provided to the extended system service table NSST and, otherwise, the operation of the corresponding function is interrupted (False). In contrast, if it is determined that the file is located in the normal disk at the previous step, the step of determining whether the application module A or A' is authorized is omitted and ZwCreateFile( ), which is a non-changed function, is provided to the extended system service table NSST.

Meanwhile, the descriptor D is pointed at the extended system service table NSST, not the system service table SST.

In FIG. 11, a dashed arrow connecting the system service table SST and the extended system service table NSST shows another type of function call, which is required for the implementation of the application modules A and A', other than the functions actually involved in the file access. In this case, the operation of the function is performed by immediately providing the corresponding function to the extended system service table NSST without processing logic in the extended service table NST.

Accordingly, the access control device 50 performs a secure function of securing files existing on the virtual disk though the above-described process.

INDUSTRIAL APPLICABILITY

According to the present invention described above, in a process of transmitting and receiving security-sensitive information data through computer communication, that is, online communication, an intentional leak of information data, committed by a user having the authority to read the corresponding information, as well as the leak of the information data, attributable to hacking committed by a third party, are fundamentally prevented, so that security-sensitive information can be efficiently protected.

The invention claimed is:

1. A secure transmission system for transmitting data between access-controlled virtual disks of a plurality of computers via online communication, the system comprising:
   a virtual disk, configured to allow only an authorized application program module to gain an access and read, write and edit information data; and
   a secure communication application module comprising user information generation means for generating intrinsic user information at the time of setting up the virtual disk, user information storage means for storing the generated user information, outgoing file management means for searching the virtual disk for information data to be sent and compressing the found information data, generating header information of the information data in which user information about a sender and/or a recipient is contained, and adding the generated header information to the user information, incoming file management means for reading header information of received information data, decompressing compressed information data, and storing the decompressed information data on the virtual disk, and file security means for encrypting and decrypting information data to be sent or received.

2. The secure transmission system according to claim 1, wherein the secure communication application module further comprises sending and reception time management means for including sending and reception time information in the header information of the information data so that the outgoing file management means for sending corresponding information data operates, when a staying period of information data received in a virtual disk of a different terminal exceeds a predetermined period.

3. The secure transmission system according to claim 1, wherein the secure communication application module further comprises a Virtual Secure Disk (VSD) connection communication means for mediating transmission and reception of user information of the virtual disk and incoming and outgoing files while directly communicating with a virtual disk of a different terminal online.

4. The secure transmission system according to claim 1, wherein the header information comprises an intrinsic ID of the virtual disk, information about a user accessing the virtual disk, and information about a type of corresponding information data.

5. The secure transmission system according to claim 1, wherein the virtual disk comprises:
   a VSD image file module configured to occupy a predetermined space of a hard disk in a file format;
   a VSD drive for processing security-sensitive files provided in the VSD image file module;
   an encryption and decryption module for encrypting and decrypting data input and output between the VSD image file module and the VSD drive,
   a VSD file system module for causing an Operating System (OS) to detect creation of a separate disk volume through the VSD drive, and thus processing access to the security-sensitive files provided in the VSD image file module; and
   an access control device for determining the access thereof by determining whether a space in which a corresponding task is performed is in the disk drive or in the VSD drive, and determining whether the application module is authorized for access to a corresponding file, when an application module accesses files of the disk drive and the VSD drive.

6. The secure transmission system according to claim 5, wherein the VSD image file module is configured such that physical designation for storing data on the hard disk is not performed and, thus, all of pieces of data are stored by a file system module that logically operates the hard disk, and the OS determines that data corresponding to a predetermined space is allocated to the hard disk and virtually, such that data can be physically allocated to the space only by an authorized application module.

7. The secure transmission system according to claim 5, wherein the access control device comprises:
   an extended system service table configured such that it is pointed out by a descriptor and a corresponding operation is performed; and
   an extended service table for changing a function that the application module requests from the system service table so as not to be operated, determining whether a space in which a corresponding task is performed is in the disk drive or in the VSD drive determining whether the application module is authorized for access to a corresponding file, and selectively determining whether to provide the non-changed function to the extended system service or to allow operation of the function to be interrupted according to a result of the determination.

8. A secure transmission method for transmitting data between access-controlled virtual disks of a plurality of computers via online communication in a secure transmission system, the secure transmission system having a virtual disk, and a secure communication application module for mediating transmission and reception of information data between the virtual disk of a dirrrent terminal, the method comprising:
   the information data search step of searching for information data to be sent from the virtual disk;
   the information data decryption step of decrypting corresponding information data encrypted in the virtual disk to gain an access to the found information data;
   the file compression step of compressing the decrypted information data;
   the header information creation step of creating header information of information data in which user information about a sender and/or a recipient of the information data is contained; and
   the file encryption step of encrypting the compressed information data including the header information.

9. The secure transmission method according to claim 8, further comprising:
   the file decryption step of receiving and decrypting a file created at the file encryption step;
   the user information identification step of determining whether reading of information data of a file received has been authorized using the header information;
   the file decompression step of decompressing the compressed information data; and
   the information data encryption step of encrypting information data to be stored on the virtual disk.

10. The secure transmission method according to claim 8, wherein the header information creation step further comprises:
   the step of performing a process of including time information so that that outgoing file management means for send corresponding information data operates, when a staying period of information data, which is received to the virtual disk of a different terminal, excesses a predetermined period; and
   the period elapse examination step of examining the staying period of the reception information data, and determining whether to send the corresponding information data.

* * * * *